United States Patent Office 3,523,085
Patented Aug. 4, 1970

3,523,085
CALCIUM SILICATE CORROSION INHIBITING INSULATION MATERIAL CONTAINING ALKALI METAL SILICATE GLASS
Richard F. Shannon, Lancaster, Ohio, assignor to Owens-Corning Fiberglas Corporation, a corporation of Delaware
No Drawing. Filed May 9, 1967, Ser. No. 637,059
Int. Cl. C04b 43/04; E04b 1/92
U.S. Cl. 252—62                                              10 Claims

ABSTRACT OF THE DISCLOSURE

A calcium silicate crystalline hydrate binder material having particles of alkali metal silicate dispersed throughout, with the crystals of calcium silicate being generally devoid of strength reducing alkali metal oxides.

BACKGROUND OF THE INVENTION

The present invention relates to calcium silicate crystalline hydrate binder materials; and more particularly to thermal insulation materials wherein fibrous materials, such as asbestos, are held together by calcium silicate crystalline hydrates.

Thermal insulation materials comprising asbestos fibers held together by calcium silicate crystalline hydrates have been known and used for many years. Some of this type of insulation materials which have been produced heretofore have contained sufficient chlorides in the form of impurities to cause chloride ion stress corrosion of stainless steels. I have found that alkali metal silicates from the group consisting of sodium silicates and potassium silicates when present in unreacted form in the insulation material, can not only counteract chloride ion impurities in the insulation material, but can inhibit chloride ion stress corrosion of stainless steels from occuring by reason of chloride ion in the surrounding atmosphere. It has been discovered that alkali metal silicates when present during the reaction of calcia and silica produce crystalline hydrates having very poor strength, which in some instances is less than ⅕ that of insulation materials produced when alkaline metal silicates are not present. Hoopes et al. U.S. Pat. 2,904,444 teaches the use of anhydrous, but soluble sodium silicate for use as an accelerator for the reaction between calcia and silica. The patent teaches that the sodium silicate must have a ratio of silicate to soda less than 3.25 to 1 in order to be sufficiently soluble as to act as a commercially feasible accelerator. I have found, however, that although alkali metal silicates speed up the reaction between silica and lime, they also produce an impure calcium silicate wherein the alkali metal is present in the crystalline structure, and that such calcia-alkali metal oxide-silicates have considerably less strength than do either substantially pure calcium silicates or calcium silicate whose crystalline structure is modified by aluminum, iron, or other group three metal oxides, and specifically the sesquioxides.

SUMMARY OF THE INVENTION

The present invention provides a calcium silicate crystaline hydrate binder having sodium silicate or potassium silicate dispersed throughout, but which has considerably more strength than have previously produced binders of comparable type. It has been discovered that calcium silicate binder materials produced by the reaction of calcia and silica in the presence of soluble alkali metal oxides have inferior strength and that calcium silicate crystalline hydrates of considerably greater strength are produced if the reaction is carried out when alkali metal oxides are not present in the aqueous solution. It has further been found that it is possible to produce crystalline calcium silicate binder materials of greatly improved strength, but which nevertheless contain either sodium silicate or potassium silicate, if certain materials and procedures are used. According to the invention, crushed sodium or potassium silicate glasses having a silica to alkali metal oxide ratio of between approximately 3.75 to 1 and 7.5 to 1, desirably between 4.2 to 1 and 6.0 to 1, and most preferably 4.5 to 1 is mixed with a slurry of calcia and silica and is poured into a mold at generally room temperature. Above approximately a ratio of 3.75 to 1, alkali metal silicates become drastically less soluble and take on the characteristics usually attributed to glasses. Below approximately 4.2 to 1, increased chemical activity creates processing difficulties. Ratios of approximately 4.5 to 1 give products having optimum strength, corrosion resistance and other processing characteristics. The mixture is thereafter heated while in a quiescent form to product the calcium silicate crystals. It has been found that by so doing, an insulation material having high strength is produced, which will nevertheless inhibit chloride ion stress corrosion of stainless steel. It has further been found that the calcium silicate crystals need not be pure calcium silicate to provide the high desired strength, but can contain alumina, iron oxide, or other sesquioxides. Improved strength can be had by initiating the reaction with crystalline calcium aluminum silicate materials, as for example, Portland cement. It has further been found that the thermal properties of the material are greatly enhanced by the addition of up to 1 percent by weight of a finely divided form af carbon.

A principal object of the present invention is the provision of a new and improved insulation material having a calcium silicate crystalline hydrate binder which will inhibit corrosion and which will nevertheless be without impaired strength.

A still further object of the invention is the provision of a new and improved insulation material having a calcium silicate crystalline hydrate binder having a lower coefficient of heat transfer than previously produced materials.

Further objects and advantages of the invention will become apparent to those skilled in the art to which the invention relates from the following description of several preferred embodiments.

DESCRIPTION OF THE PREFERRED EMBODIMENTS

According to the invention, it has been discovered that insulation materials having calcium silicate crystalline hydrate binders will inhibit chloride ion stress corrosion of stainless steels, and will have high strength, if the reaction of the calcia and the silica is carried on in a water media which contains dissolved alkaline metal oxide in an amount less than approximately 2 percent of the available reactive calcia, and if a sodium silicate glass or a potassium silicate glass is present having a silica to alkali metal oxide weight ratio of at least 3.75 to 1, preferably 4.5 to 1 and has less than approximately 12 percent of other oxides. Most preferably, the alkali metal oxide to CaO ratio should be below 2.0 percent since the strength begins to decrease at this point. The insulation must be substantially devoid of zinc oxide, lithium oxide, and other materials known to cause stress corrosion cracking of stainless steel. The glass should be present in an amount greater than approximately 0.75 pound per cubic foot of the insulation material. More than approximately 3 pounds per cubic foot of the glass increases the density and thermal conductivity unduly. The process of producing the insulation material comprises mixing the various materials in water preferably below 212° F. and most preferably at room temperature and processing the slurry into molded shapes after which the solids remain generally quiescent, and the later stages of reaction of the calcia and the silicate take place to produce the calcium silicate binder. The glass preferably has a silica to alkali metal oxide ratio of between approximately 4.5 to 1 and 6.0 to 1.

The following example demonstrates that liquid alkali metal silicate in the slurry from which calcium silicate crystalline binders are produced interferes with the formation of a high strength material.

A water slurry having a water to solids ratio of 6 to 1 is prepared having the following solids:

| Solids: | Parts by wt. |
|---|---|
| Asbestos | 500 |
| Quicklime (94% CaO available) | 880 |
| Diatomaceous earth | 1100 |
| Clay (Kaolin) | 100 |
| Crushed stone filler 325 mesh | 160 |
| Fines | 475 |
| Liquid sodium silicate 3.75 to 1 (32.1% solids) | 1246 |

Since all of the soda from the sodium silicate is solubilized, the ratio of soda to calcia is computed as follows to be .1018 or 10.18 percent.

$$\frac{1246 \times .321 \times 100}{4.75 \times 880 \times .94} = 10.18\%$$

The slurry is prepared by blending the clay, crushed stone, and four fifths of the asbestos into a tank containing one half of the water at room temperature and thoroughly mixing these materials. The remainder of the asbestos and the fines are added to a second tank containing one half of the water at room temperature and these materials are thoroughly mixed. Thereafter, both tanks are mixed together and the lime is added and hydrated for from 3 to 5 minutes, the diatomaceous earth, powdered silica are added and mixed for three minutes. Thereafter, the sodium silicate is added and mixed only long enough to achieve a uniform blend. Very little temperature rise of the slurry takes place during mixing due to the heat of hydration of the lime, and the final temperature of the slurry will usually be less than approximately 80° F.

The slurry as thus prepared is prehardened 1 to 3 hours in a live steam chamber heated to 190° F. Thereafter, it is poured into open type cavity molds which are thereafter indurated in a steam autoclave which is brought up to a pressure of approximately 250 pounds per square inch and a temperature of approximately 208° C. over a period of one hour. This temperature and pressure is held for a sufficient length of time to form tobermorite, usually approximately four hours, after which the pressure is slowly reduced. The total pressurizing induration and depressurizing cycle will usually take approximately six hours. The induration treatment is fully described in the U.S. Pat. 2,547,127 issued to George L. Kalousek and by mesne assignment, assigned to the assignee of this invention.

The insulation material made as above described had a density of 11.0 pounds per cubic foot, a modulus of rupture of only 17, and a shrinkage of 2.44 percent.

The modulus of rupture given above was determined by the procedure specified by the Standard Test Method Designation ASTM C203–58.

The shrinkage given above was determined by cementing steel strips on the opposite ends of a 12 inch long block of insulation. The distance between the surfaces of the steel strips are measured, the block is heated in air for 24 hours at 1200° F. and the distance is again measured. The loss in length is calculated as a percentage of the original length.

A determination of the soluble silicates provided by the finished insulation material gave a numerical value of 34,149 parts per million. It has been determined that insulation materials containing soluble sodium or potassium silicates in an amount giving an average of approximately 25,000 parts per million of soluble silicates will inhibit chloride ion stress corrosion of stainless steels.

The soluble silicate determination is made by shredding 25 grams of the insulation material into one liter of distilled water contained in a beaker. The beaker is covered with a watch glass and heated in an oven at a controlled temperature of 150° F. for 24 hours. At the end of this period, the sample is filtered and then washed with 500 milliliters of hot distilled water. The filtrate is acidified with hydrochloric acid and then evaporated to dryness and baked for at least one hour. The residue is moistened with concentrated hydrochloric acid and baked for another hour. After cooling, 500 milliliters of hydrochloric acid are added and heat is applied until all soluble salts are in solution. A volume of distilled water three times that of the solution is added, and this diluted solution is then heated to just below boiling. The solids are filtered from the liquid and alternately washed with hot normal hydrochloric acid solution followed by hot water, and the filtrate set aside. The solids are dried and ignited and finally burned at 1500° F. in a platinum crucible. The crucible and contents are weighed and the silica volatilized with hydrochloric acid and sulfuric acid and the crucible again weighed. The loss in weight is taken as the total silica. Any appreciable residue left in the crucible after volatilization is fused with sodium carbonate and leached out by the filtrate previously set aside. A calcium determination is made of the new filtrate by conventional methods and the calcium is calculated to calcium silicate ($CaSiO_3$). The remaining silica is calculated to sodium silicate ($Na_2SiO_3$).

The corrosion inhibiting properties of the above sample of insulation material were determined by bending a 1 inch wide by 6 inch long by 16 gage thick strip of type 304 stainless steel into a U-shape having a radius of one inch. A hemicylindrical depression of 1 inch radiuus is made in the top surface of a 4 inch high by 3.5 inch wide by 3 inch thick block of insulation. A through bolt extending through the legs of the stainless steel strip is tightened to stress the strip to 90 percent of its yield strength. The insulation is placed in a crystallizing dish and the dish filled to ¼ inch below the depression with distilled water to which sodium chloride is added to give 1500 p.p.m.±30 p.p.m. of chloride ion. The curved section of the test strip is placed in the depression and an alternating current of 6 to 11 volts is passed through the strip to heat and maintain the strip at a temperature of 100° C. Distilled water is added periodically to maintain the liquid level. If the strips do not crack in 144 hours of testing, the insulation is considered to inhibit chloride ion stress corrosion.

After 15 days of the above test, the insulation material showed no evidence of stress corrosion.

The following test indicates that even anhydrous sodium silicate interferes with the formation of high strength calcium silicate binders.

EXAMPLE 2

A slurry of the following composition of parts by weight was prepared:

| Solids: | Parts by wt. |
|---|---|
| Asbestos | 500 |
| Quicklime (94% CaO) | 880 |
| Silica flour | 389 |
| Diatomaceous earth | 634 |
| Clay | 100 |
| Crushed stone filler 235 mesh | 160 |
| Fines | 375 |
| Solid sodium silicate 3.22 to 1 (40 to 80 mesh) | 408 |

An insulation material was produced from this slurry using the same procedure as described in Example 1. This material had a modulus of rupture of 35 and a density of 11.1 pounds per fabric foot.

An otherwise equivalent product having a density of 11 lbs./ft.$^3$ would have a modulus of rupture of 34.4 as determined by the following formula:

$$\left(\frac{D_1}{D_2}\right)^2 \times M_2 = M_1$$

A modulus of at least 50 is desired in order to produce insulation material of acceptable strength, and the density must preferably be approximately 11 lbs./ft.$^3$. The anhydrous sodium silicate used had a silica to soda ratio of 3.22 and is the highest silica to soda radio of anhydrous material produced commercially, because silicates having a higher ratio dissolve too slowly for commercial processes. The insulation had a soluble silicate level of 19,852 parts per million, and 2 out of 5 specimens tested as above described cracked after six days.

The following example indicates that a soda glass, as opposed to an anhydrous sodium silicate, can be present in the calcia-silica slurry without appreciably reducing the strength of the crystalline binder produced.

EXAMPLE 3

| Solids: | Parts by wt. |
|---|---|
| Asbestos | 500 |
| Quicklime (94% CaO) | 880 |
| Silica flour | 378 |
| Diatomaceous earth | 616 |
| Clay | 100 |
| Crushed stone filler 325 mesh | 160 |
| Fines | 375 |
| Solid sodium silicate 4.5 to 1 (40 to 80 mesh) | 405 |

An insulation material was prepared using the same procedure given in Example 1. This insulation material had a density of 10.5 lbs./ft.$^3$, a modulus of rupture of 51 and 5 out of 5 specimens withstood the corrosion test for 6 days.

The following example demonstrates that insulation material prepared using glasses having silica to soda ratios between approximately 4.5 and 6.0 to 1 produce insulation materials having substantially the same or better corrosion inhibiting properties and strength.

EXAMPLE 4

An insulation material was prepared from a slurry having the following composition using the same procedures given in Example 1.

| Solids: | Parts by wt. |
|---|---|
| Asbestos | 500 |
| Quicklime (94% CaO) | 880 |
| Silica flour | 0 |
| Diatomaceous earth | 916 |
| Clay | 100 |
| Crushed stone filler 325 mesh | 160 |
| Fines | 375 |
| Solid sodium silicate 6 to 1 | 320 |

This material had a density of 11.2 lbs./ft.$^3$, a modulus of rupture of 61, and 5 out of 5 samples withstood the 6 day corrosion test.

EXAMPLE 5

An insulation material was prepared using the following materials using the same procedure given in Example 1:

| Solids: | Parts by wt. |
|---|---|
| Asbestos | 500 |
| Quicklime (94% CaO) | 880 |
| Silica flour | 372 |
| Diatomaceous earth | 608 |
| Clay | 100 |
| Crushed stone filler 325 mesh | 160 |
| Fines | 375 |
| Solid sodium silicate 6 to 1 | 400 |

This insulation material had a density of 11.93 lbs./ft.$^3$, a modulus of rupture of 53, and 5 out of 5 specimens withstood the 6 day corrosion test.

EXAMPLE 6

Insulation material was made from the following materials using the same procedure given above.

| Solids: | Parts by wt. |
|---|---|
| Asbestos | 500 |
| Quicklime (94% CaO) | 880 |
| Diatomaceous earth | 1086 |
| Clay | 100 |
| Crushed stone filler 325 mesh | 160 |
| Fines | 375 |
| Solid sodium silicate 7.5 to 1 | 340 |

This insulation material had a density of 11.2 lbs./ft.$^3$, a modulus of rupture of 51 and 3 out of 5 specimens withstood the 6 day corrosion test.

The preferred materials of the invention are prepared using glass in an amount greater than approximately 7 percent by weight of the total solids, which glass has a silica to alkali metal oxide ratio of at least 3.75. In addition, a small amount of liquid alkali metal silicate is used in an amount less than approximately 2 percent of the reactive calcia in the slurry.

EXAMPLE 7

An insulation material made from the following solids had a density of 11.8 lbs./ft.$^3$, a modulus of rupture of 50, and a ratio of dissolved soda to calcia of approximately 1.7 percent.

| Solids: | Parts by wt. |
|---|---|
| Asbestos | 500 |
| Quicklime (94% CaO) | 880 |
| Silica flour | 348 |
| Diatomaceous earth | 567 |
| Clay | 100 |
| Crushed stone filler 325 mesh | 160 |
| Fines | 375 |
| Liquid sodium silicate (40% solids) 3.22 to 1 | 128 |
| Solids sodium silicate 4.5 to 1 | 240 |

The above material had a strength approximately equal to prior art insulation materials devoid of soluble silicates. This insulation material when tested inhibited corrosion of stainless steel for ten days.

The following example demonstrates that satisfactory insulation materials can be prepared using potassium silicate glass.

EXAMPLE 8

An insulation material prepared from the following materials in parts by weight was prepared using the same procedure given above:

| Solids: | Parts by wt. |
|---|---|
| Asbestos | 500 |
| Quicklime (94% CaO) | 880 |
| Silica flour | 378 |
| Diatomaceous earth | 616 |
| Clay | 100 |
| Crushed stone filler 325 mesh | 160 |
| Fines | 375 |
| Anhydrous potassium silicate 4.5 to 1 SiO$_2$/K$_2$O ratio | 405 |

This insulation material had a density of 11.0 lbs./ft.$^3$, a modulus of rupture of 51, and none out of 5 specimens cracked in the 6 day corrosion test.

The following example demonstrates that the presence of calcium alumina silicate and other calcium, sesquioxide, silicates can be used as seed crystals to induce quick and initial combining of the calcia and the silica in a ratio of approximately 1 to 1.

EXAMPLE 9

An insulation material was made from the following materials using the same procedure given above:

| Solids: | Parts by wt. |
|---|---|
| Asbestos | 500 |
| Quicklime (94% CaO) | 820 |
| Silica flour | 275 |
| Diatomaceous earth | 528 |
| Clay | 100 |
| Crushed stone filler 325 mesh | 170 |
| Fines | 329 |
| Carbon black (50% solid) | 16.3 |
| Liquid sodium silicate (32.1% solids) 3.75 to 1 | 47 |
| Sodium silicate glass 4.5 to 1 | 433 |

This material had a modulus of rupture of 50, a density of 11.1 lbs./ft.³, soluble soda to calcia of 0.41 percent, and a K value of .492 at 500° F. Insulation material prepared from the same materials excepting that no carbon is used has a K value of approximately .550 at 500° F.

EXAMPLE 10

An insulation material is made from the following materials using the same procedure given above:

| Solids: | Parts by wt. |
|---|---|
| Asbestos | 500 |
| Quicklime | 620 |
| Silica flour | 225 |
| Diatomaceous earth | 500 |
| Clay | 100 |
| Crushed stone filler 325 mesh | 130 |
| Fines | 350 |
| Portland cement | 376 |
| Carbon black (50% solids) | 33 |
| Liquid sodium silicate (32.1% solids) 3.75 to 1 | 150 |
| Sodium silicate glass 4.5 to 1 | 440 |

This material had a modulus of rupture of 59, a density of 11.1 pounds per cubic foot, and a K value of .500 at 500° F. Five out of five test specimens when tested for corrosion, as above described, ran for ten days without cracking. In computing alkali metal oxide to calcia ratio of formulations using Portland cement, the CaO content of the Portland cement is included as reactive calcia, since the Portland cement acts as seed crystals for the calcia silica binder growth and therefore is part of the nominal calcium silicate crystalline binder. A determination of the Na₂O/CaO ratio of the above example is as follows:

$$4.75 \frac{150 \times .321 \times 100}{[(620 \times .94) + (376 \times .496)]} = 1.31\%$$

It is believed that the use of sesquioxides, such as Al₂O₃, Fe₂O₃, B₂O₃, etc. aid in the dissolving of the silica by the calcia to quickly produce initial crystalline material of approximately the correct calcium and silica ratio. The lattice so produced is thereafter added onto by the calcia and silica in approximately the same ratio to produce the desired crystalline lattice. Where neither sesquioxides or alkali metal oxides are present, the silica is slowly dissolved by the calcia to produce a solution that has too high a calcia to silica ratio, which must thereafter be changed by the migration of silica into the crystalline structure to produce crystals of the proper silica to calcia ratio to give the desired strength. This is a generally slow and time consuming process. The calcium sesquioxide silicate should preferably be present in an amount less than that of the calcia.

Where alkaline metal oxides are present in the solution from which the calcium silicate crystals grow, the alkaline metal oxide enters into the crystalline lattice and produces low strength materials. In addition, it appears that alkaline metal oxides dissolve or leach silica more quickly than does calcia, to form a solution high in silica. Crystals grown from this solution are weak and require migration of calcia into the lattice to produce crystals having better strength. Because of the great number of competing reactions when alkaline metal oxides are present, it is surprising that an insulation material can nevertheless be produced having a high modulus of rupture and inhibit corrosion. It has further been found that where a product more dense than 11 pounds per cubic foot is acceptable, the silica to soda ratio of the glass can go as low as 3.75 to 1 and still give a product of acceptable strength, provided the density when 3.75 glass is used is at least 13.5 pounds per cubic foot. Under these conditions, the silica to soda ratio of the glass may be expressed as $$4.2 - 0.45 \left(\frac{D}{13.5}\right)^4$$

wherein D is the density of the finished insulation product.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

What is claimed is:

1. A body of thermal insulation which inhibits stress corrosion of stainless steel caused by chloride ion, said insulation material being formed of a noncombustible fibrous material as an inert filler bound together by crystals of a calcium silicate hydrate formed in situ by the reaction of CaO and SiO₂, said insulation material containing between approximately 0.75 pound per cubic foot and approximately 3.0 pounds per cubic foot of a crushed alkali metal silicate glass having a silica to alkali metal oxide ratio of between approximately 3.75 and approximately 7.5, said glasses being selected from the group consisting of sodium silicate having up to 12% of other oxides and potassium silicate having up to 12% other oxides, and the reaction of the CaO and SiO₂ being carried out in an aqueous slurry in which the dissolved alkali metal oxide is less than approximately 2% by weight of the CaO in the slurry.

2. The material of claim 1 wherein the alkali metal silicate has a silica to alkali metal oxide ratio of approximately 4.5 to 1.

3. A body of thermal insulation which inhibits stress corrosion of austenitic stainless steel caused by chloride ion, said insulation material being formed of a inert noncombustible fibrous filler bound together by crystals of a calcium silicate hydrate formed in situ by the reaction of CaO and silica, said insulation material containing from approximately 0.75 lbs./ft.³ to approximately 3 lbs./ft.³ of a crushed alkali metal silicate glass having a silica to alkali metal oxide ratio of more than approximately $$4.2 - .45 \left(\frac{D}{13.5}\right)^4$$

where D is the density of the finished insulation product, said glasses being selected from the group consisting of sodium silicate glass having up to 12 percent of other oxides and potassium silicate glass having up to 12 percent of other oxides, and the reaction of the CaO and silica being carried out in an aqueous slurry in which the dissolved alkali metal oxide is less than approximately 2 percent by weight of the CaO in the slurry.

4. The insulation material of claim 3 in which the alkali metal silicate glass is sodium silicate glass.

5. The insulation material of claim 3 in which the reaction of the CaO and silica is carried out in the presence of calcium aluminum silicate.

6. The insulation material of claim 5 wherein the calcium aluminum silicate is Portland cement.

7. The insulation material of claim 3 having from approximately 0.25 percent to approximately 1.0 percent by weight of a finely divided form of carbon disbursed throughout.

8. An insulation material formed by heating a slurry of a fibrous filler and binder forming materials consisting essentially of the following approximate weight percentages of materials to a temperature between approximately 300° F. and 400° F.: between 30 to 40 CaO, between 30 to 40 finely divided silica, up to 8 clay, up to 8 crystalline calcium aluminum silicate, up to 1 finely divided carbon; and between 10 to 25 of a crushed alkali metal silicate glass from the group consisting of sodium silicate glass and potassium silicate glass, said alkali metal silicate glass having a silica to alkali metal oxide ratio of more than approximately 4.2 to 1.

9. The insulation material of claim 8 wherein the alkali metal silicate glass in the forming slurry is sodium silicate glass.

10. The insulation material of claim 9 wherein the slurry composition consists essentially of the following approximate percentages by weight.

| | |
|---|---:|
| Asbestos | 50 |
| Quicklime | 62 |
| Crystalline silica | 22 |
| Diatomaceous earth | 50 |
| Clay | 10 |
| Sodium silicate glass | 44 |
| Fillers | 48 |
| Carbon black | 0–3.3 |
| Portland cement | 0–38 |

References Cited

UNITED STATES PATENTS 2,904,444   9/1959   Hoopes et al. _____ 106—78

LEON D. ROSDOL, Primary Examiner

I. GLUCK, Assistant Examiner

U.S. Cl. X.R.

106—14, 74, 76, 78; 252—387